United States Patent [19]
Colter et al.

[11] 4,070,045
[45] Jan. 24, 1978

[54] SEPARABLE CONNECTION FOR CONDUIT SEGMENTS CONVEYING A FLUID UNDER PRESSURE

[75] Inventors: John S. Colter, Topsfield, Mass.; Alfred J. Schommer, E. Hampstead, N.H.

[73] Assignee: Watts Regulator Company, Lawrence, Mass.

[21] Appl. No.: 710,416

[22] Filed: Aug. 2, 1976

[51] Int. Cl.² ............................................. F16L 19/02
[52] U.S. Cl. ..................................... 285/325; 285/421
[58] Field of Search ................... 285/325, 326, 421; 403/319, 324, 331, 381

[56] References Cited

U.S. PATENT DOCUMENTS

| | | | |
|---|---|---|---|
| 189,905 | 4/1877 | Rideout | 285/325 |
| 218,723 | 8/1879 | Faust | 285/325 X |
| 295,151 | 3/1884 | Cummins | 285/325 |
| 959,854 | 5/1910 | Grierson | 285/325 |
| 979,481 | 12/1910 | Hannold | 285/325 |
| 1,169,389 | 1/1916 | Forsman | 285/325 |
| 3,977,703 | 8/1976 | Curtis | 285/325 |

*Primary Examiner*—Dave W. Arola
*Attorney, Agent, or Firm*—Norman Lettvin

[57] ABSTRACT

An improved separable connection, between conduit segments for conveying therethrough a fluid under pressure, is provided by flange and socket means that permits telescoping to initially locate the axes of the conduit segments within a plane, and then employing cam means to move the axes of the conduit segments into axial alignment while simultaneously moving the conduit segments axially toward each other to effect compression of seal means therebetween to effect a fluid-tight seal of the connected conduit means.

19 Claims, 4 Drawing Figures

SEPARABLE CONNECTION FOR CONDUIT SEGMENTS CONVEYING A FLUID UNDER PRESSURE

FIELD OF INVENTION

This invention relates to a separable connection between conduit segments for conveying therethrough a fluid under pressure, and more particularly this invention relates to such a connection which may be selectively separated and/or formed in the field without use of expensive or specialized tools.

BACKGROUND OF THE INVENTION

The use of fluid under pressure as an energizing source, and the need for conveying such pressurized fluid through conduit that includes fluid-tight service connections, are notoriously old. Heretofore, the requirement of providing a fluid-tight service connection has generally required expensive or special constructions to insure sealing, and has frequently required expensive or specialized tools, or connectors, that create problems in field servicing the connection, as contrasted to servicing and/or assembly in a factory where special tools and servicing equipment may be maintained readily available.

Thus, it is one object of this invention to provide a new and improved connection between conduit segments that is constructed to provide for simplicity of assembly and disassembly of the conduit segments and for effectiveness in securing a fluid-tight seal at the separable connection.

Another object of this invention is to provide an improved connection between segments of a conduit by using cam means for developing a high mechanical advantage to effect compression of seal means at the connection, so as to achieve a highly effective and efficient fluid-tight seal.

Still another object of this invention is to provide a fluid-tight connection, between segments of a conduit, that may be assembled and disassembled quickly and effectively by use of only a single forcing member, in the form of a simple drive pin.

A further object is to provide for air line systems the combination of standardized equipment capable of transmitting therethrough wide ranges of air flow volumes, but with the control for a limited range of air flow that is actually to be passed through the air line system being controlled by one connector segment that secures to one end of the equipment in a separable fluid-tight connection.

Further objects and advantages will become apparent to one skilled in the art from the following description of the invention.

SUMMARY OF THE INVENTION

A separable field connection for conduit members, that may be readily separated or joined together by using inexpensive tools, is provided by equipping adjacent ends of conduit segments with flange and socket means arranged for manual partial telescoping to initially align the axes of the flow passageways of the conduit segments in a single axial plane, and by providing on the adjacent ends of the conduit segments two sets of cooperating cam means arranged for driving the axes of the passageway means into linear alignment while simultaneously compressing a seal means for the connection between the adjacent ends of conduit segments, the driving being achieved by using only a single drive pin to effect both cam-related movements.

Preferred forms of the invention are disclosed in the following drawings forming part of the disclosure of the invention.

DETAILED DESCRIPTION OF THE DRAWINGS

Figure 1:
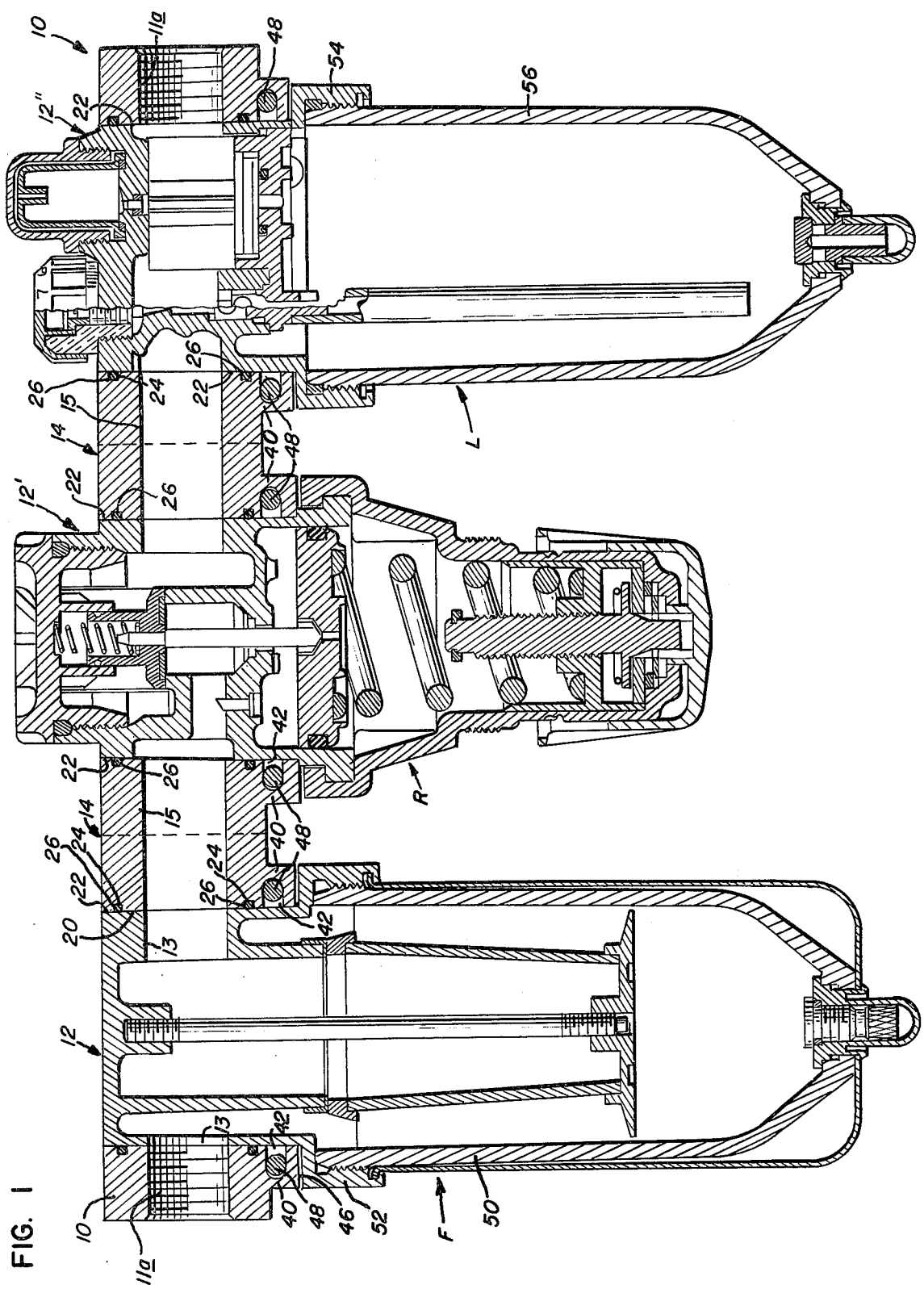
FIG. 1 is a longitudinal, axial cross-section view of one typical installation of a set of equipment, such as a filter, regulator, and lubricator for use in an air line system, wherein the present invention is to be employed, and showing in cross-section the connection of this invention employed as part of single-ended and double-ended conduit segment connectors.

Referring now to the drawings, FIG. 1 discloses a portion of conduit means for an air line system that includes therein equipment such as a filter, regulator and lubricator, the conduit means including segments of passageway means through the heads of the equipment, and double-ended and single-ended conduit segments which interconnect with the said passageway means segments of the equipment to provide a conduit means portion with fluid-tight seals between each pair of segments that make up the conduit means portion.

More specifically, the flow passageway segments of FIG. 1 include, from left to right, a single-ended conduit segment connector 10, the head 12 of an air line filter generally indicated F, a double-ended conduit segment connector 14, the head 12' of a regulator generally indicated R, a second double-ended conduit segment connector 14, the head 12" of an air line lubricator generally indicated L, and a second single-ended conduit segment connector 10. The double-ended connectors 14 are identical and merely interconnect different pieces of equipment. The single-ended connectors 10 are also identical but they connect at different ends so that they are in mirror image position respecting each other.

Figure 4:
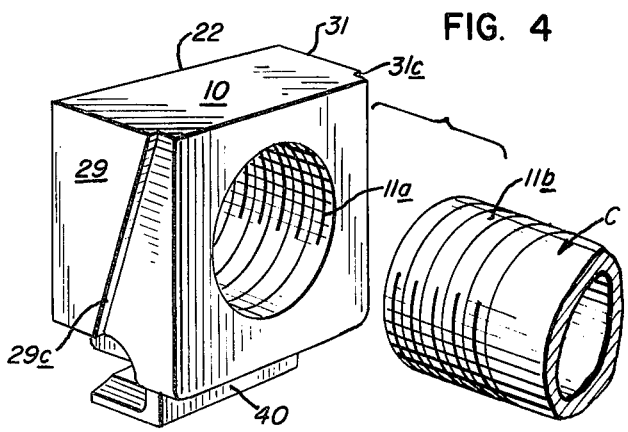
FIG. 4 is a fragmentary exploded view illustrating a typical screw-type connection of a conduit segment to a single-ended conduit segment connector whose free end embodies features of this invention.

In FIG. 4, a single-ended conduit segment connector 10 is shown with a female threaded bore 11a for screw-threaded connection to the male threaded end 11b of a conduit tube C, as is known in the art. It is the free end of the single-ended conduit segment 10 that embodies features of this invention. The double-ended conduit segment connectors 14 are provided with smooth bores 15 therethrough because each end thereof embodies features of this invention and such ends are conveniently designed for connecting directly to the head of a piece of flow-through equipment such as the heads 12, 12', or 12" respectively of an air filter F, of a regulator R, or of a lubricator L.

The improvement invention herein lies in the structural features employed for connecting with a fluid-tight seal the free connection end of a single-ended connector 10, or either end of a double-ended connector 14, to the head of the piece of equipment through which a gas, or some other fluid, is to flow. For purposes of describing the invention as part of a preferred example of an installation it will be understood that the heads 12, 12' and 12" of the air line equipment each has air flow passageway means therein that serve to provide flow openings that are to be axially aligned with either a threaded bore 11a of single-ended connector 10, or a smooth bore 15 of a double-ended connector 14. Therefore, a typical connection embodying the invention will be explained by reference to FIGS. 1–3, and particularly with reference to FIGS. 2 and 3.

Figure 2:
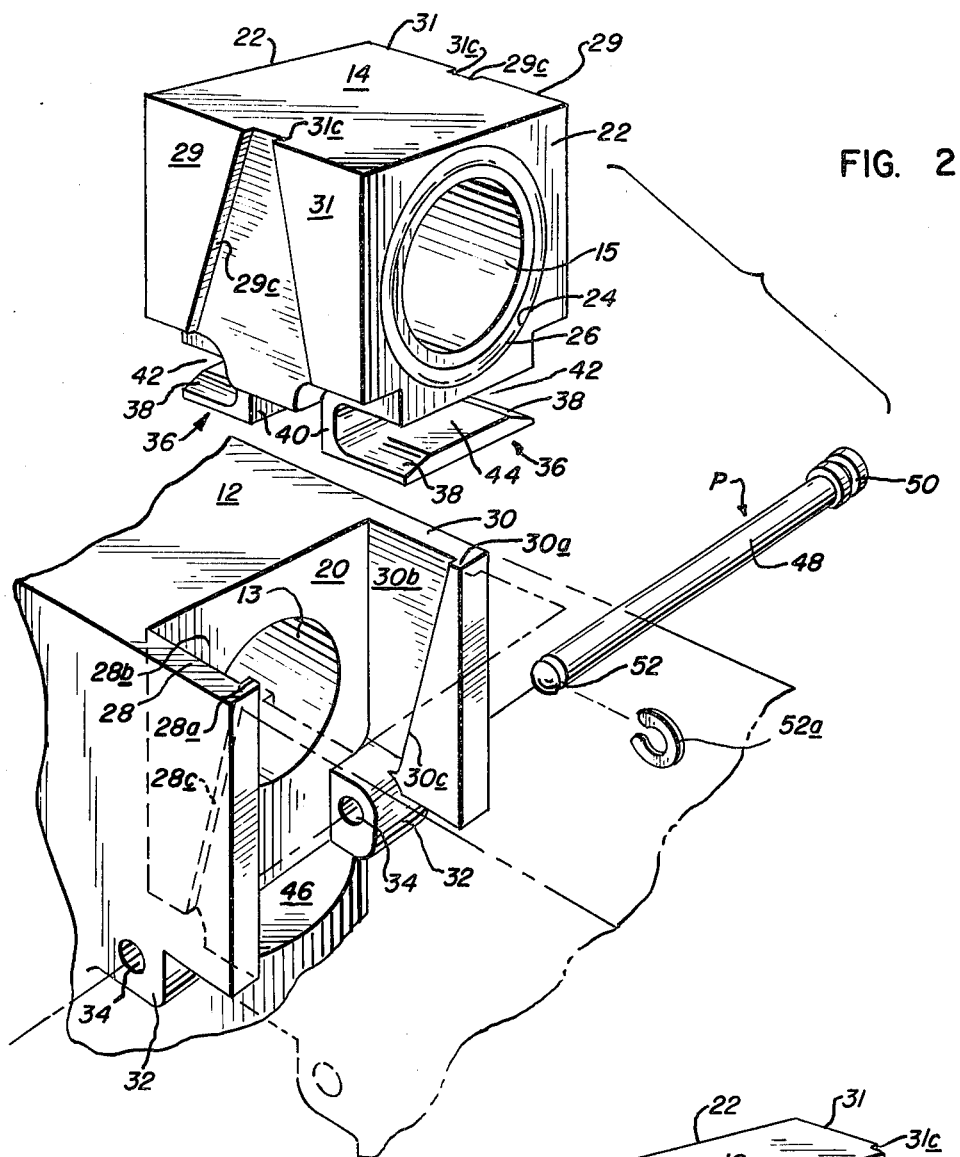
FIG. 2 is an exploded perspective view illustrating the parts of a typical separable connection of this invention, and showing a fragment of a head member embodying features of this invention for cooperation with the illustrated double-ended conduit segment connector, and showing the single drive pin that serves to effect the connection.
Figure 3:
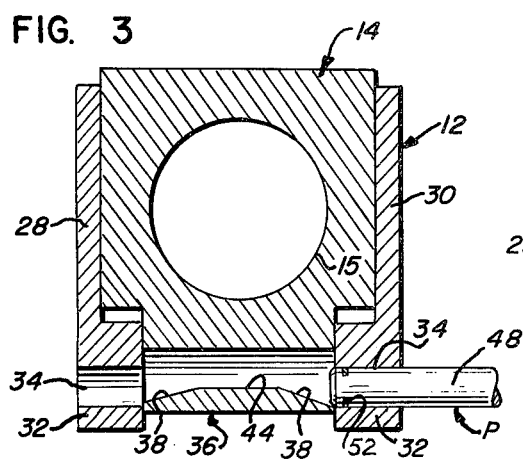
FIG. 3 is a cross-sectional view taken transversely of the axis of the flow passageway means through a connection between conduit segments, and showing how the drive pin is employed with cam means on the cooperating segments of the connection to bring the axes of the passageway means into linear alignment.

FIG. 2 should be considered to illustrate the right-hand end of the head 12 of a piece of equipment, such as of air line filter F, and its associated double-ended conduit segment connector 14. The head 12 is a block of material such as aluminum or steel that has been formed or shaped, by casting or machining to provide, at the end thereof that is shown, a flat abutment face 20 that surrounds the terminus of a bore, or flow passageway means 13. The plane of the abutment face 20 is transverse to the longitudinal axis of bore 13, but it is inclined slightly away from a plane that would be perpendicular to that longitudinal axis. The cooperating face at the left-hand end of conduit segment connector 14 is not seen, but it is identical with the right-hand end of conduit segment connector 14 which is shown to provide a generally flat abutment face 22 that surrounds the terminus of flow passageway means 15. The plane of abutment face 22 is inclined to the same degree as the incline of the plane of abutment face 20, because those faces 20 and 22 are to be brought into close adjacency in the assemblage as seen in FIG. 1. The abutment face 22 of the connector is provided with a depressed annular groove 24 therein that surrounds the terminus of flow passageway means 15, or 11a, and a resilient seal means in the form of O-ring 26 is positioned in recess 24. The sizes of recess 22 and O-ring 26 are selected such that an annular chordal segment of the seal means, O-ring 26, projects outwardly of the plane of abutment face 22 and is adapted to be compressed against the abutment face 20 to provide a highly effective seal.

The cooperating portions of head 12 and an end of a connector 14, or of a connector 10, are shaped to provide interfitting flange means and socket means. While it is not too important which conduit segment provides the flange means or the socket means since there must be one of each, in the preferred construction illustrated, the socket means are provided on the ends of heads 12, 12' and 12", while the flange means are provided on the free ends of the connectors 14 or 10.

In FIG. 2 the socket means are shown as including two spaced parallel walls 28 and 30 that extend from abutment face 20, on opposite sides of the bore 13 and parallel to the bore's longitudinal axis, the walls having inturned retainer flanges 28a and 30a thereon projecting toward each other and defining recesses 28b and 30b for receiving thereinto flanges defined on a connector segment 14, or 10. The edges 28c and 30c of flanges 28a and 30a that face abutment face 20 are located in a plane that is inclined so that the plane's projection will intersect with a projection of the plane of abutment face 20. The recesses 28b and 30b are frusto-conical sockets, and edges 28c and 30c are elongated cam surfaces that provide a wedging effect upon flanges that enter sockets 28b and 30b so as to force abutment face 22 toward abutment face 20.

The flange means on connector segments 14, or 10, are oppositely facing pairs of wedge-shaped flange elements, or lands, 29 and 31 of a size and shape for close interfitting with the sockets 28b and 30b. The length of a double-ended connector segment 14 is selected to provide for two sets of wedge-shaped elements 29 and 31 at the ends thereof, and sufficient space between such sets to accommodate two adjacent retainer flanges 28a and 30a. The wedge-shaped flange elements are respectively bounded by an abutment face 22 and an inclined cam edge, respectively 29c and 31c, for camming cooperation with cam edges 28c and 30c.

Adjacent the lower ends of recesses 28b and 30b that are of least width, there are provided a pair of laterally spaced enlargements, or ears, 32 extending outwardly of abutment face 20 and with aligned bores 34 therethrough. The bores 34 are located outwardly of abutment face 20 and their axis lies skew of the longitudinal axis of the flow passageway means 15 in double-ended connector 14, or 11a in single-ended connector 10, but positioned in a plane perpendicular to the axis of such flow passageway means.

Each connector end of a connector segment 14, or 10, has associated therewith an abutment leg 36, with lateral cam ramps 38, that is longitudinally elongated in a direction parallel to the flow axis of the flow passageway 15 or 11a. The elongated abutment leg 36 is secured at one longitudinal end thereof to the body of the segment connector by a transverse leg 40, with leg 36 extending longitudinally forward from transverse leg 40 in the direction toward the plane of an abutment face 22, to define between leg 36 and the segment connector body an open-sided transverse slot, or sleeve-like seat, 42 of a minimum dimension at least as great as the diameter of bore 34. The width of leg 36 is less than the spacing between the two ears 32, so as to slidably enter therebetween. The leg 34 has a raised center portion 44 that merges with oppositely extending, downwardly and outwardly inclined cam ramps 38. The leg 34 is of a size and construction so that it will not interfere with an abutment shoulder 46 on a connector portion of head 12 that lies generally at or below the lower extremity of bored ears 32.

The means for securing together adjacent ends of two connector segments, such as head 12 and double-ended connector segment 14 shown in FIG. 2, or for effecting a quick disconnect or separation in the field for effecting servicing, includes a forcing member drive pin or disconnect pin, P, whose shank 48 is of a length to extend through the pair of aligned bores 34 in ears 32. The shank 48 of the drive pin has a head 50 at one end and a tapered, or rounded, tip at the other end provided with a circumferential groove 52 for receiving therein a split ring, or "C"-washer-type retainer, as is well known in the art for purposes of preventing inadvertent movement of the drive pin.

During an assembly of the two segments of the connection disclosed, a free end of connector segment 14, or 10, is initially telescoped into socket means on head 12 by thrusting the frusto-conical flanges 29 and 31 into sockets 28b and 30b. This operates to initially align the longitudinal axes of flow passageways 13 and 15 in an axial plane, but not axially aligned, with the parts moved substantially to the position seen in full lines in FIG. 3, with the ramps 38 positioned to be engaged by the tip of drive pin P that has been entered in one of the bores 34. Then by a force applied against head 50 of drive pin P, manually or by an impact member, the pin shank 48 is caused to slide through bores 34, effecting a camming action against leg 36 and driving the connector segment 14, or 10, in a downward direction, as viewed in FIG. 3. This camming action between drive pin P and leg 36 causes the cam surfaces 29c and 31c to move against cam surfaces 28c and 30c, thereby forcing the abutment surfaces 20 and 22 axially toward each other, and effecting compression of the seal means 26, with a substantial mechanical advantage to secure an effective fluid-tight seal between the two connector segments of the connection. The elongated open-sided slot 42 accommodates movement relative to pin shank 48 as a connector segment 14, or 10, moves axially relative to a head 12. At the same time that the seal means 26 is being compressed by movement of abutment surfaces 20 and 22 toward each other, the further telescoping of the flange means into the socket means causes the planarly aligned longitudinal axes of flow passageways 13 and 15 to be also moved into a position of substantially precise axial alignment, which can be seen in the assembly view of FIG. 1. Thus, both assembly and disassembly is effected by substantially only movement transversely of the longitudinal axis, and separation of parts by movement longitudinally, as existed with prior connectors, has been substantially eliminated.

With the tip of pin shank 48 extended beyond the opposite ear 32, a split ring retainer 52a may be entered into groove 52 and the pin P then cannot be inadvertently withdrawn. For servicing, the split ring retainer 52a is first removed, and by an axial force applied to the tip of pin shank 48, the pin may be withdrawn to disconnect the adjacent connection segments 12 and 14. The telescoped parts may then be separated by transverse force applied thereto, and servicing may be effected in the field and the parts reconnected after servicing to obtain a fluid-tight seal without use of special tools.

The cam elements 29c, 31c, and 28c, 30c, are inclined at a greater angle to a reference plane perpendicular to the flow axis of the bores 13 and 15, than is the angle of incline of the abutment surfaces 20 and 22 to said reference plane, and this fact provides for development of a substantial mechanical advantage during movement of the parts along the cam edges, and resulting in development of substantial axial force for compression of the seal means 26 as the abutment surfaces 20 and 22 are moved toward each other.

With respect to the physical constructions of the filter, regulator, and lubricator shown in FIG. 1, it is sufficient to note that there will be minor relevant variations in the structures of these devices to accommodate them for usage with the connection invention described above. Thus, with regard to the filter F, the head 12 is vertically elongated to accommodate connector segments 10 and 14, and head 12 is provided with an integral, depending, female-threaded sleeve connector 52 to which a standard filter bowl 50 may be screw connected. The head 12 is diametrically apertured to provide apertures 13 that align with flow apertures such as 11a and 15 as above described. The portion of the filter internally of head 12 may be elongated to accommodate the increased height of the head 12 above the sleeve connector 52 that connects to the filter's bowl 50.

As to the regulator R, it will be recognized that the head 12' has attached thereto a spring-type controller with an adjustable control and lock means therefor, of the type generally disclosed in U.S. Pat. No. 3,955,647.

As to the lubricator L, the head 12" thereof is also slightly modified over prior art constructions, to provide an elongated super-structure above the female-threaded connection sleeve 54 which is provided integral with and as part of head 12", the female-threaded sleeve providing for the usual connection thereto of a bowl 56 for the air line lubricator.

The combination disclosed in FIG. 1 has certain further advantages in that the relatively complex air line equipment, such as filter F, regulator R and lubricator L, may be provided individually or as the package shown, with the flow-passageway means therethrough designed to be capable of passing a wide range of flow volumes, from very small quantities up to as much as 250 cubic feet per minute.

Then, considering flow to be from left to right in FIG. 1, the left-hand single-ended connector segment 10 may be used both as a connector body for effecting a separable connection with the left-hand, or upstream, end of filter F, and also as an upstream adapter for connection to an intake or feed in line whose size may be such as to limit the range of flow of air through the system.

It will be recognized by those skilled in the art that user requirements sometimes call for a system to deliver a different volume of air flow than the capacity of the equipment then available. Rather than modifying the relatively complex air line equipment shown, a flexibility of installation may be achieved in the field by using equipment with, for example, a 1 inch flow bore capable of transmitting maximum flow therethrough, of say up to 250 cfm, and then varying the size of the flow-passageway means, say between ¼ inch to 1 inch, through the connector 10.

Thus, heads 12, 12' and 12", and double-ended connectors 14 are each provided with flow-passageway means therethrough of the size as shown to accommodate maximum flow, but at least one of the single-ended connectors 10, which is of relatively less cost than the complex equipment, is provided with a reduced bore therethrough, either by reducing the size of opening 11a or by increasing the wall thickness of conduit C which connects into bore 11a. This reduced size flow bore of connector 10 serves to adapt complex equipment of maximum size, flow-through capacity, as seen in FIG. 1, to feed in lines carrying lesser volume rate of flow, thus providing a flexible and inexpensive design feature for varying volume-carrying capacity of an installation that is designed to pass maximum flow.

While one particular form of improved separable connection has been disclosed, it will be appreciated that changes and modifications can be made to the embodiments disclosed herein without departing from the spirit and scope of this invention, and therefore, the invention is to be defined by the appended claims.

What is claimed and desired to be secured by Letters Patent of the United States is:

1. In a separable connection between a pair of elongate conduit members, through which extend longitudinal flow passageway means for conveying a fluid under pressure, the flow passageway means in the conduit members requiring substantially precise alignment and a fluid-tight seal between conduit members when they are properly connected; the improved separable connection comprising, in combination:

the adjacent ends of the pair of conduit members each including an abutment face lying transverse to the axis of the flow passageway means and surrounding a terminus of the flow passageway means;

a compressible seal means surrounding a terminus of the flow passageway means in one of the pair of conduit members at each separable connection defined between a pair of conduit members;

flange means and socket means, on respective adjacent ends of the pair of conduit members, arranged to effect initial telescoping therebetween to planarly align the axes of the flow passageway means in the pair of conduit members, with the abutment faces spaced apart slightly and the seal means uncompressed;

and cam means on said adjacent ends of the pair of conduit members for simultaneously forcing the planarly aligned axes of the flow passageway means into substantially precise axial alignment while axially compressing the compressible seal means between the abutment faces on the pair of conduit members, to provide a fluid-tight seal for the flow passageway means at the separable connection, said cam means including a bored sleeve means provided on one of the pair of conduit members, the longitudinal axis of the bored sleeve means lying parallel to the abutment face of the one conduit member and lying skew of, but in a plane perpendicular to, the axis of the flow passageway means; the other of said pair of conduit members providing an abutment leg with a cam surface thereon that is positionable laterally adjacent the bored sleeve means; and an elongated drive pin arranged for selective slidable entry into the bore of said bored sleeve means and arranged to be selectively forced laterally into sliding and driving engagement with the cam surface on the abutment leg, to thereby move the abutment leg and said other conduit member relative to the one conduit member.

2. A separable connection as in claim 1 wherein the abutment face is planar and lies in a plane that is inclined at a slight angle to a plane perpendicular to the longitudinal axis of the flow passageway means.

3. A separable connection as in claim 1 wherein the abutment face on one of the conduit members is provided with a depressed annular groove surrounding the terminus of the flow passageway means, and the compressible seal means is an "O"-ring that is positioned in said groove with a lateral portion of said "O"-ring projecting outwardly of the plane of the abutment face.

4. A separable connection as in claim 1 wherein one of the pair of conduit members serves as a portion of a device for conditioning the fluid passing through the flow passageway means, said one conduit member having a pair of abutment faces formed thereon and lying in planes inclined at an angle such that projections thereof intersect, and the second of each pair of conduit members, that define the separable connection, carrying the compressible seal means for said separable connection.

5. A separable connection as in claim 1 wherein said cam means includes a set of planar cam elements on the telescoping portions of the adjacent ends of the pair of conduit members for forcing the pair of abutment faces toward each other, to effect compressing the compressible seal means with substantial force, as the telescoping portions are moved relative to each other in a direction to effect further telescoping beyond said initial telescoping.

6. A separable connection as in claim 5 wherein the elements of said set of cam elements includes inclined planar surfaces associated with each abutment face but spaced therefrom.

7. A separable connection as in claim 6 wherein the abutment face is planar, and lies in a plane that is inclined at a slight angle to a reference plane that is perpendicular to the longitudinal axis of the flow passageway means, and each inclined, planar surface, cam element associated with the abutment plane being inclined to the reference plane at a greater angle than the angle of incline of the abutment face.

8. A separable connection as in claim 1 wherein the driven abutment leg provides an inclined cam ramp extending laterally thereof in a direction to be engaged and cammed by the free end of the elongated drive pin as the pin is thrust from one portion of the sleeve means toward a second portion of the sleeve means.

9. A separable connection as in claim 1 wherein the abutment leg is mounted relative to its associate conduit member to define a laterally elongated, open-sided, sleeve-like seat for slidably receiving therein the drive pin that moves the abutment faces of the pair of conduit members toward each other.

10. A separable connection as in claim 5 wherein one of the pair of conduit members has a pair of elongated spaced flanges projecting from the abutment wall thereof, the spaced flanges and abutment wall together defining said socket means, and said set of planar cam elements including inclined cam surfaces provided adjacent the extended ends of the flanges and within a plane lying transverse to the flanges, said cam surfaces facing the associated abutment wall on the conduit member and serving as part of said set of planar cam elements.

11. A separable connection as in claim 1 wherein one of the pair of conduit members has a pair of spaced bosses with axially aligned bores therethrough, projecting from the abutment wall thereof, the aligned bores adapted to slidably receive said elongated drive pin.

12. A separable connection as in claim 5 wherein one of the pair of conduit members has projecting therefrom both (a) a pair of spaced parallel walls with cam surfaces thereon, and (b) a pair of spaced bosses with aligned bores therethrough; the parallel walls and abutment wall defining said socket means; the other of said pair of conduit members having (c) oppositely extending wedge-shaped lands thereon bounded by cam surfaces spaced from the abutment wall thereof to provide said flange means, and (d) an abutment leg, with cam means thereon, of a size for entry between the pair of spaced bosses and at an attitude for driving engagement thereof by said elongated drive pin slidable axially of the aligned bores through said spaced bosses.

13. A separable connection as in claim 1 wherein one of the pair of conduit members is part of a piece of relatively complex equipment constructed for handling a wide range of volumes of fluid flow therethrough, and the other of the pair of conduit members being a relatively inexpensive connector with flow-passageway means therethrough constructed to adapt the range of flow volumes that will be passed through the relatively complex equipment.

14. A separable connection as in claim 13 wherein the relatively inexpensive connector is a single-ended connector.

15. A separable connector as in claim 13 wherein the relatively inexpensive connector is a single-ended connector with flow-passageway means therethrough of a selected size that is reduced relative to the size of the flow-passageway means in the piece of complex equipment to which the single-ended connector secures.

16. A separable connection as in claim 1 wherein said bored sleeve means include two spaced portions, and said abutment leg is of a size and arrangement to slidably move in the space between said two spaced portions of the bored sleeve means.

17. In a separable connection between a pair of conduit members through which extend flow passageway means for conveying a fluid under pressure, the flow passageway means in said conduit members requiring substantially precise alignment and a fluid-tight seal between conduit members when they are operatively connected, the adjacent abutment faces of said conduit members lying in parallel planes that are inclined to a reference plane that is perpendicular to the longitudinal axis of the flow passageway means that are aligned when the conduit members are operatively connected, and with compressible seal means carried by at least one of the conduit members and extending beyond the inclined face thereof toward the inclined face of the other conduit member; the improvement comprising, in combination:

telescoping connection means carried by the respective adjacent ends of the pair of conduit members to permit relative movement of said conduit ends in opposite directions transverse to said longitudinal axis of the flow passageway means, a first set of planar cam elements operatively associated with the adjacent ends of the pair of conduit members and arranged for forcing said adjacent faces toward each other to compress the compressible seal means when movement is effected in one of said opposite directions; and a second set of cam elements operatively associated with said adjacent ends of the pair of conduit members for selectively effecting an operative connection, or for permitting separation, of the adjacent ends of the pair of conduit members.

18. A connection as in claim 17 wherein the first set of planar cam elements lie in planes that are inclined to said perpendicular reference plane at a greater angle than the angle of incline of the planes in which the abutment faces are located.

19. A connection as in claim 17 wherein the second set of cam elements includes bored sleeve means on one of the conduit members with the axis of the bore thereof spaced from and lying in a plane perpendicular to said longitudinal axis of the flow passageway means; the other conduit member providing an abutment leg with a cam surface thereon aligned laterally of the bored sleeve means to permit of said telescoping movement without interference between the leg and the sleeve means, and an elongated drive pin for selective slidable entry into the bore of said bored sleeve means and arranged to be selectively forced laterally into sliding and driving engagement with the cam surface of the abutment leg to move the abutment leg and other conduit member into an operative position and with said seal means compressed to effect a fluid-tight seal.

* * * * *